July 9, 1957   P. O. STELLING ET AL   2,798,792
METHOD FOR THE PRODUCTION OF FINELY DIVIDED SILICON DIOXIDE
Filed July 3, 1950
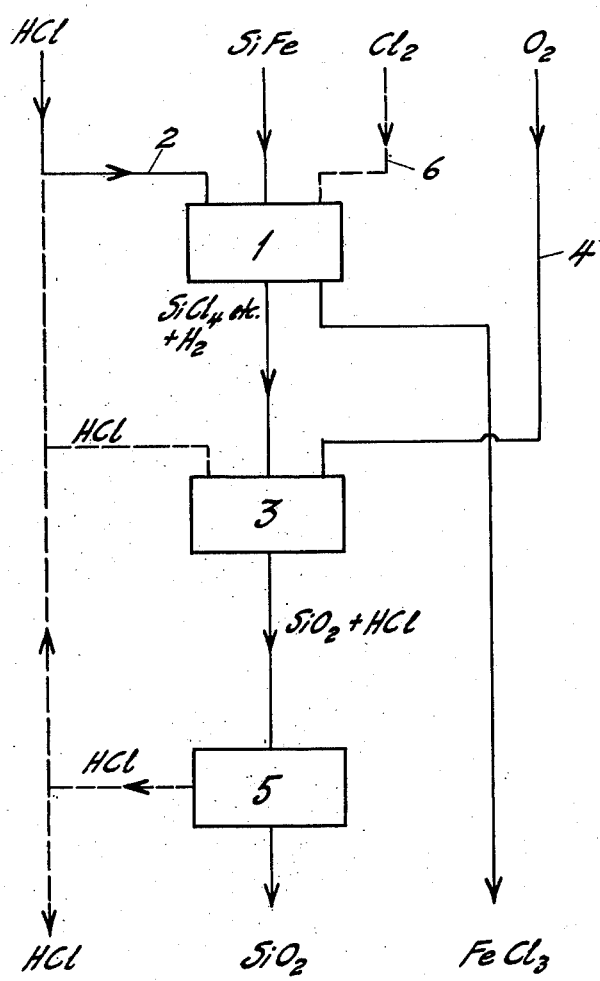
Inventors
Per O. Stelling +
Gosta L. Flemmert
By Young, Emery + Thompson
Attys.

United States Patent Office 2,798,792
Patented July 9, 1957

2,798,792
METHOD FOR THE PRODUCTION OF FINELY DIVIDED SILICON DIOXIDE

Per Otto Stelling and Gösta Lennart Flemmert, Stockholm, Sweden, assignors to Helsingborgs Gummifabriks Aktiebolag, Halsingborg, Sweden, a corporation of Sweden Application July 3, 1950, Serial No. 171,938

Claims priority, application Sweden July 20, 1949

7 Claims. (Cl. 23—182)

The present invention relates to a method for the production of very finely divided silicon dioxide.

For many purposes it is important to be able to produce extremely finely divided silicon dioxide, for example, a silicon dioxide with a particle size of 5–400 m$\mu$. Finely divided silicon dioxide of this kind may be advantageously employed as a filler in rubber and synthetic compounds which are required to have a light colouring. Furthermore, such a product can be used as a constituent part in paints or varnishes, particularly for the purpose of imparting a dull lustre to the coating produced by the paint or varnish. Another suitable range of application is as a heat-insulating material in refrigerators, cold storage cars or the like, for example, on account of the extremely low heat conducting capacity of the finely divided silicon dioxide.

It has been known for some years past that finely divided silicon dioxide can be produced by treating silicon with chlorine, at which reaction silicon tetrachloride and ferric chloride are mainly obtained. The silicon tetrachloride is purified by distillation after which it is subjected to combustion in hydrogen and air. At this combustion finely divided silicon dioxide and strongly diluted hydrochloric acid are formed. Furthermore, it is known that finely divided silicon dioxide may be produced by combustion of certain silicon organic compounds, silicon vapour and silicon monoxide.

The known methods referred to above are relatively expensive. Thus, for example, in the production of silicon dioxide using chlorine as a starting material, approximately 2.4 kgs. of chlorine are required for every kg. of silicon dioxide. The price of chlorine is relatively high. If organic silicon compounds, silicon vapour or silicon monoxide are taken as starting materials the costs for the production of the finely divided silicon dioxide will be still higher.

The present invention relates to a new method for the production of extremely finely divided silicon dioxide, which method is not only cheaper but is also accompanied by a number of important advantages which are more particularly described hereafter.

According to the invention silicon or a silicon alloy is treated at an elevated temperature with dry hydrochloric acid for the formation of silicon chlorine compounds and/or silicon chlorine hydrogen compounds, such as silicon tetrachloride, silicon chloroform and the like, and free hydrogen, whereupon the chlorine containing silicon compounds so obtained are hydrolised in gaseous form to produce silicon dioxide, which is obtained in a finely divided state, and free hydrochloric acid.

This method is cheaper than formerly known methods, since hydrochloric acid can usually be obtained at a lower price than chlorine. In addition, hydrochloric acid is formed at the hydrolysis of silicon chlorine and silicon chlorine hydrogen compounds so that a cyclic process can be carried out as regards the hydrochloric acid, the hydrochloric acid formed at the hydrolysis being used again for the treatment of further quantities of the starting material. Another great advantage is that in the reaction between silicon or a silicon alloy and hydrochloric acid, hydrogen is formed so that the gas mixture obtained can be burnt directly without the addition of any other combustible gas, such as hydrogen, coal gas or the like.

In order to produce finely divided silicon dioxide with the desired particle size it is important to be able to vary the dilution of the gases containing silicon chlorine and/or silicon chlorine hydrogen compounds within wide limits prior to the hydrolysis. This was formerly effected by the addition of inert gases. In the process according to the invention it is possible to vary the dilution merely by regulating the temperature of the furnace for the production of the gaseous silicon compounds, an increase in the temperature causing a displacement of the equilibrium

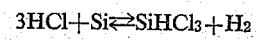

and

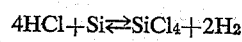

to the left, so that the gases issuing from the furnace contain a constantly increasing quantity of hydrochloric acid.

To render the invention clear, reference is made to the accompanying drawing which shows diagrammatically a suitable plant for carrying out the process.

Silicon or a silicon alloy, such as silicon iron, is placed in a crushed condition in a chlorination furnace 1 and is pre-heated, by electrical means for example, to a suitable temperature, usually 400–500° C. Dry hydrochloric acid is then introduced through a pipe 2 in the furnace and reacts with the silicon iron to form silicon tetrachloride and/or silicon chloroform together with hydrogen in accordance with the formulas set out above.

The mixture of the gaseous silicon compound and hydrogen is conveyed from the chlorination furnace to a hydrolysing apparatus 3 in which the hydrolysis takes place. The latter can be effected either by directly bringing together the gaseous reaction products with water vapour or by introducing a suitable quantity of oxygen into the hydrolysing apparatus through a pipe 4 to bring about combustion of the hydrogen in the said mixture so as to form water vapour which immediately reacts with the silicon compounds to form a very finely divided silicon dioxide and hydrochloric acid. The oxygen is preferably introduced in a quantity equivalent to that of the hydrogen and silicon compounds, in which case the hydrochloric acid produced at the hydrolysis will be practically pure. This is of importance for the subsequent use of the hydrochloric acid either as a chlorinating medium for further amounts of silicon iron in which case it is returned through the pipe 2 to the furnace 1, or as a chlorinating medium in the organic industry, as for example, for the production of chlorinated solvents or of polyvinylchloride or in other processes for which dry, highly concentrated hydrochloric acid is employed. If oxygen is applied in a quantity which is less than that equivalent to the hydrogen, not all the silicon compound will be hydrolised and the products issuing from the hydrolysing apparatus will contain unconsumed silicon compound and hydrogen which are then preferably returned to the chlorination furnace 1. If oxygen is supplied in excess of the quantity equivalent to the hydrogen, free oxygen will, of course, be present in the products issuing from the hydrolysing apparatus. This should be avoided if it is intended to carry out the process as a cyclic process with respect to the hydrochloric acid.

The products from the hydrolysing apparatus 3 are led into a dust separator 5 in which the finely divided silicon dioxide is deposited whilst the gaseous products, that is to say, mainly HCl, are withdrawn through the pipe 2 in order to be returned to the chlorination furnace 1 in the case illustrated (or possibly in part to the hydrolysing apparatus 3).

In certain cases it is desirable to be able to raise the temperature in the chlorination furnace, for example, in order to displace the equilibrium and produce greater dilution of the gaseous silicon compound with hydrochloric acid. For this purpose a suitable quantity of chlorine may be led into the furnace 1 through a pipe 6.

*Example 1*

In a brick-lined shaft furnace silicon iron of 92% was heated up electrically to about 600° C., after which approximately 5 kgs. of dry hydrochloric acid were introduced per hour into the furnace. By regulating the temperature of the hydrochloric acid supplied, the furnace was adjusted at 650° C. The gases formed at the reaction were purified by partial condensation and were conveyed through a heat insulated pipe line to a burner where they were burnt with air. On combustion, a finely divided silicon dioxide was formed together with hydrochloric acid, which mixture was led to a dust separator in which approximately 2 kgs. of silicon dioxide were separated out per hour whilst the hydrochloric acid was conveyed to an absorption tower. The silicon dioxide was examined in an electron microscope and was found to have a mean particle diameter of 160 m$\mu$. The yield of silicon dioxide was 97% of the amount calculated theoretically.

*Example 2*

The experiment was carried out in the same apparatus and in the same manner as in Example 1, with the difference, however, that in addition to 5 kgs. of hydrochloric acid, 0.5 kg. of chlorine were introduced into the chlorination furnace per hour. In this way the temperature in the furnace could be raised to 1050° C., thus producing a displacement of the equilibrium

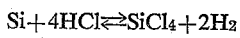

$$Si + 4HCl \rightleftharpoons SiCl_4 + 2H_2$$

so that the silicon tetrachloride formed during the reaction was strongly diluted with hydrochloric acid. The gases obtained from the chlorination were purified and burnt with air, whereafter the silicon dioxide obtained from the combustion was separated out. The yield was 98% of the theoretical quantity. In this case the mean particle diameter was 50 m$\mu$.

*Example 3*

In this experiment the same apparatus was employed as in both the examples described above, with the difference, however, that the apparatus was fitted with pipes and valves and a fan for conveying the gas which had passed through the dust separator, to the chlorination furnace. The process was started by heating the chlorination furnace electrically, whereupon 5 kgs. of hydrochloric acid and 0.5 kg. of chlorine were introduced into the furnace per hour. The gases from the furnace were purified by partial condensation and were then burnt with oxygen. The silicon dioxide was separated out in a dust separator and the hydrochloric acid was initially absorbed in water. After all air had been driven out of the apparatus the absorption tower was cut off, however, and the gases formed during the combustion were conveyed instead to the chlorination furnace so that a circulation of the chlorine and hydrogen was achieved. In order to cover the loss of chlorine and hydrogen, 0.3 kg. of hydrochloric acid was introduced per hour immediately in front of the chlorination furnace whilst a corresponding quantity of gas mixture was drawn off through a spill valve located behind the dust separator. The silicon dioxide yield was 98% of the amount calculated theoretically. The mean particle diameter was 90 m$\mu$.

What we claim is:

1. In a process of making finely divided silicon dioxide the steps of reacting at a temperature of at least 650° C. a silicious substance selected from the group consisting of silicon and silicon alloys with dry hydrochloric acid to form a gaseous mixture of chlorine containing silicon compounds and hydrogen and subjecting the gaseous chlorine containing silicon compounds in said gaseous mixture to hydrolysis.

2. In a process of making finely divided silicon dioxide the steps of reacting at a temperature of at least 650° C. a silicious substance selected from the group consisting of silicon and silicon alloys with dry hydrochloric acid to form a gaseous mixture of chlorine containing silicon compounds and hydrogen, and adding oxygen to the hot gaseous reaction products to burn the hydrogen therein and produce water vapor which reacts with the chlorine containing silicon compounds and hydrolyses the same.

3. In a process as claimed in claim 2, wherein oxygen added in an amount equivalent to that of the free hydrogen of the reaction mix so that the hydrochloric acid produced will be practically pure.

4. In a process of making finely divided silicon dioxide the steps of reacting at a temperature of at least 650° C. a silicious substance selected from the group consisting of silicon and silicon alloys with dry hydrochloric acid to form a mixture of chlorine containing silicon compounds and hydrogen, and adding water vapor to the hot gaseous reaction products for hydrolysing the chlorine containing silicon compounds therein.

5. In a process of making finely divided silicon dioxide the steps of reacting at a temperature of at least 650° C. a silicious substance selected from the group consisting of silicon and silicon alloys with dry hydrochloric acid to form a gaseous mixture of chlorine containing silicon compounds and hydrogen, hydrolysing the gaseous chlorine containing silicon compounds in said gaseous mixture to form finely divided silicon dioxide and hydrochloric acid and using the hydrochloric acid so obtained for treating further amounts of silicious substance.

6. In a process of making finely divided silicon dioxide the steps of reacting at a temperature of at least 650° C. a silicious substance selected from the group consisting of silicon and silicon alloys with a mixture of dry hydrochloric acid and chlorine to form a gaseous mixture of chlorine containing silicon compounds and hydrogen and subjecting the gaseous chlorine containing silicon compounds in said gaseous mixture to hydrolysis.

7. In a process of making finely divided silicon dioxide the steps of reacting at a temperature of at least 650° C. a silicious substance selected from the group consisting of silicon and silicon alloys with dry hydrochloric acid to form a gaseous mixture of chlorine containing silicon compounds and hydrogen, diluting said gaseous mixture with dry hydrochloric acid, and subjecting the gaseous chlorine containing silicon compounds in said gaseous mixture to hydrolysis.

References Cited in the file of this patent

UNITED STATES PATENTS

| 1,451,399 | Low | Apr. 10, 1923 |
| 1,539,342 | Williams | May 26, 1925 |
| 1,843,576 | McClure et al. | Feb. 2, 1932 |
| 1,959,748 | Svendsen | May 22, 1934 |
| 2,499,009 | Wagner | Feb. 28, 1950 |
| 2,614,906 | Spialter et al. | Oct. 21, 1952 |

OTHER REFERENCES

"K–3" Silicon Dioxide for Rubber Filler, by Love et al., FIAT Final Report 743 (PB 22624), April 24, 1946, Office of Military Government for Germany (U. S.).